No. 760,658. PATENTED MAY 24, 1904.
C. F. STODDARD.
CIRCUIT BREAKER.
APPLICATION FILED JUNE 8, 1903.
NO MODEL. 2 SHEETS—SHEET 2.

WITNESSES: INVENTOR.
Charles F. Stoddard
BY
ATTORNEYS.

No. 760,658. Patented May 24, 1904.

UNITED STATES PATENT OFFICE.

CHARLES F. STODDARD, OF BOSTON, MASSACHUSETTS, ASSIGNOR TO AMERICAN PNEUMATIC SERVICE COMPANY, OF DOVER, DELAWARE, A CORPORATION OF DELAWARE.

CIRCUIT-BREAKER.

SPECIFICATION forming part of Letters Patent No. 760,658, dated May 24, 1904.

Application filed June 8, 1903. Serial No. 160,471. (No model.)

*To all whom it may concern:*

Be it known that I, CHARLES F. STODDARD, of Boston, in the county of Suffolk and State of Massachusetts, have invented certain new and useful Improvements in Circuit-Breakers, of which the following is a specification.

My invention relates to new and useful improvements in circuit-breakers; and its object is to produce a simple and efficient apparatus for breaking after the lapse of a predetermined time the electric circuit after an impulse has passed through it.

My invention consists of certain novel features hereinafter described, and particularly pointed out in the claims.

Figure 1:
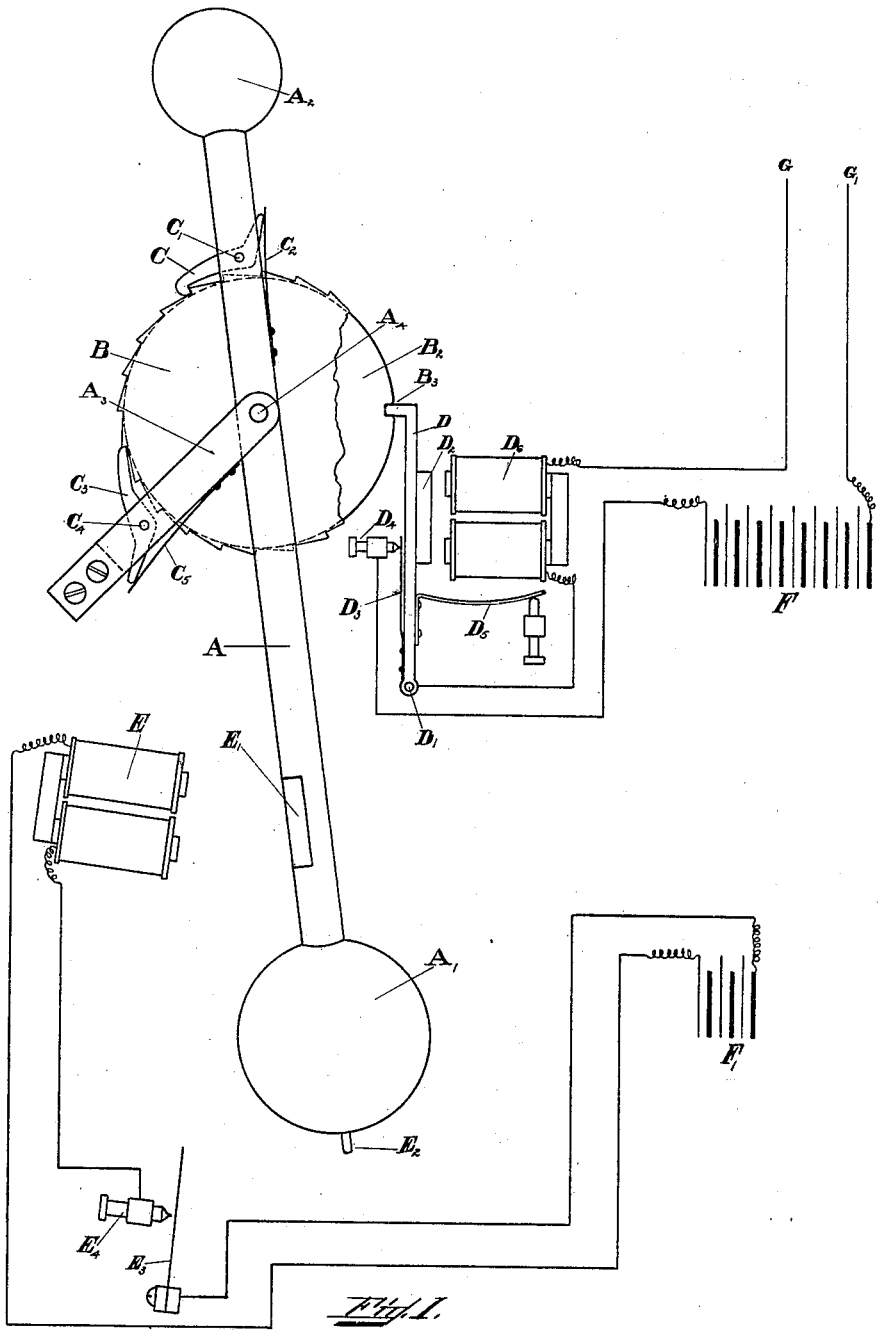
Figure 2:
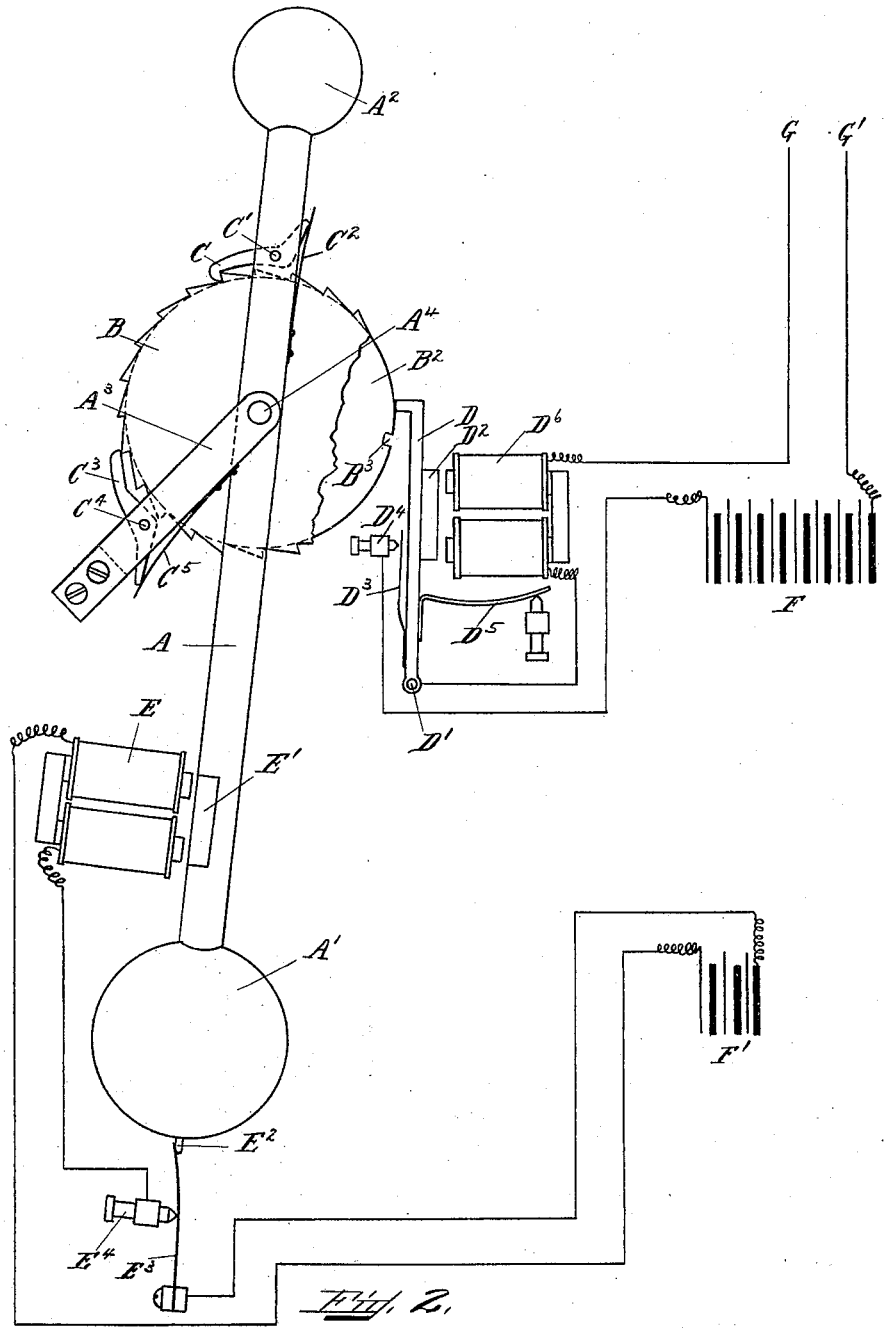

In the accompanying drawings, which illustrate a construction embodying my invention, Figure 1 shows a side elevation of the apparatus embodying my invention with the circuit open. Fig. 2 is a similar view showing the circuit closed.

Like letters of reference refer to like parts throughout both views.

The pendulum A swings on the shaft $A^4$, on which are also mounted the ratchet-wheel B and the stop-wheel $B^2$, located to one side of the pendulum A. The shaft $A^4$ is supported on the upper end of the arm $A^3$. The pendulum A is provided with the pendulum-weights $A'$ $A^2$. When the circuit is closed on a line outside of the conductors G G', the current passed from the battery F to the adjusting-screw $D^4$ into the spring $D^3$ and then to the arm D, which is pivoted at D', and from thence to the magnet $D^6$ into the conductor G, returning on the conductor G'.

The current in passing from the electric magnet $D^6$ causes this magnet to draw the armature $D^2$, which is secured on the arm D, up to it, thereby pulling the upper end of the arm D out of the slot $B^3$ in the wheel $B^2$, connected to the ratchet-wheel B. The pendulum A then swings over, turning the ratchet-wheel B by means of the pawl C, pivoted at C' on the pendulum A and under tension of the spring $C^2$ the distance of one tooth of the circumference. The stop-wheel $B^2$ in turning with the ratchet-wheel B moves the slot $B^3$ away from the arm D. When the magnet $D^6$ draws the arm D to it, the circuit is broken between the spring $D^3$ and the adjusting-screw $D^4$ and is not closed again until the slot $B^3$ traverses a complete circle around the shaft $A^4$ back to the position shown in the drawings, when the arm D falls back into it. The spring $D^5$ presses the arm D toward the stop-wheel $B^2$ all the time, and when the recess comes around to a position opposite the arm D the spring causes the upper end of said arm D to drop into the recess $B^3$ and stop the pendulum at the extreme limit of its motion, so that it has all of its energy made potential, and this energy, when the arm D releases the stop-wheel $B^2$, becomes active energy and the pendulum swings back. The circuit is closed when the slot $B^3$ comes into a position so that the arm D may fall into it. The pawl $C^3$ is pivoted at $C^4$ on the arm $A^3$ and held against the ratchet-wheel B by the spring $C^5$ for the purpose of keeping it from backing up. The pendulum A is accelerated on its vibration by means of the magnet E, which when the circuit is closed between the spring $E^3$ and the adjusting-screw $E^4$ attracts the armature E'. The circuit between the adjusting-screw $E^4$ and the spring $E^3$ is closed by the finger $E^2$ on the bottom of the weight A' striking the spring $E^3$ and bringing it against the adjusting-screw $E^4$. This spring $E^3$ is made of such length that the finger $E^2$ will slip off of it just before the armature E' comes into contact with the magnet E. By this arrangement the pulling power of the magnet E is discontinued just before the armature E' reaches it, so that the pendulum is not held in its extreme position and is free to return by gravity. While the circuit was closed by the spring $E^3$ engaging the screw $E^4$, the magnet E accelerates the motion of the pendulum A, thereby making up for loss by friction and other causes. The current is supplied to the magnet E by the auxiliary battery F'. The position of the slot $B^3$ on the wheel $B^2$ is such that the arm D will drop into it when the pendulum is in its extreme position at the end of the stroke where the pawl C just engages a tooth of the ratchet-wheel B. As shown in Fig. 1, the pendulum-weight A' is near the limit of oscillation.

This device is to be used in connection with a transmission-tube for pneumatic-despatch tubes, its object being to break the electric circuit which controls the apparatus determining lapses of time between successively-despatched carriers. The apparatus on the sending-terminal is so arranged that it will not allow the carrier to pass into the machine unless the electromagnet acts, and by means of the circuit-breaker the time between the despatching of carriers is controlled.

I do not limit myself to the arrangement and construction shown, as the same may be varied without departing from the spirit of my invention.

Having thus described the nature of my invention and set forth a construction embodying the same, what I claim as new, and desire to secure by Letters Patent of the United States, is—

1. In a circuit-breaker, a pivoted swinging member, means for normally holding said member in a position near the limit of oscillation when the circuit is open, and means for releasing said holding means when the circuit is closed so that when the swinging member is released the circuit is opened.

2. In a circuit-breaker, a pivoted swinging pendulum, means for normally holding said pendulum in a position near the limit of oscillation when the circuit is open, and means for releasing said holding means when the circuit is closed so that when the swinging pendulum is released the circuit is opened.

3. In a circuit-breaker, a pivoted swinging pendulum, means for normally holding said pendulum in a position near the limit of oscillation when the circuit is open, means for releasing said holding means when the circuit is closed so that when the swinging pendulum is released the circuit is opened, and means for accelerating the movement of said pendulum when the circuit is closed.

4. In a circuit-breaker, a pivoted swinging pendulum, means for normally holding said pendulum in a position near the limit of oscillation when the circuit is open, means for releasing said holding means when the circuit is closed so that when the swinging pendulum is released the circuit is opened, and electrical means for accelerating the movement of said pendulum when the circuit is closed.

In testimony whereof I have signed my name to this specification, in the presence of two subscribing witnesses, this 4th day of June, A. D. 1903.

CHARLES F. STODDARD.

Witnesses:
E. L. HARLOW,
A. L. MESSER.